United States Patent
Möser

(10) Patent No.: US 6,722,874 B1
(45) Date of Patent: Apr. 20, 2004

(54) REGULATING AND CONTROL DEVICE FOR A NEEDLE ELEMENT OF A HOT OR COLD CHANNEL OF A PLASTIC SHAPING TOOL

(76) Inventor: Hansjürgen Möser, Ahornweg 13, DE-96117 Memmelsdorf-Drosendorf (DE)

( * ) Notice: Subject to any disclaimer, the term of this patent is extended or adjusted under 35 U.S.C. 154(b) by 20 days.

(21) Appl. No.: 10/130,163
(22) PCT Filed: Oct. 27, 2000
(86) PCT No.: PCT/DE00/03830
§ 371 (c)(1), (2), (4) Date: May 15, 2002
(87) PCT Pub. No.: WO01/36174
PCT Pub. Date: May 25, 2001

(30) Foreign Application Priority Data

Nov. 17, 1999 (DE) ......................... 199 55 320

(51) Int. Cl.[7] .............................. B29C 45/23
(52) U.S. Cl. .................. 425/564; 425/566; 425/DIG. 5
(58) Field of Search ................. 425/562, 563, 425/564, 565, 566, DIG. 5

(56) References Cited

U.S. PATENT DOCUMENTS 4,330,258 A * 5/1982 Gellert ..................... 425/564
5,078,589 A   1/1992 Osuna-Diaz
5,238,378 A   8/1993 Gellert
6,390,804 B1 * 5/2002 Akino et al. ........... 425/DIG. 5

FOREIGN PATENT DOCUMENTS

DE 196 11 880 10/1997
DE 198 57 735 6/2000
EP 0 369 509 5/1990

* cited by examiner

Primary Examiner—Tim Heitbrink
(74) Attorney, Agent, or Firm—Bachman & LaPointe, P.C.

(57) ABSTRACT

A control and regulating device for a needle element (24) of a hot or cold channel (20) of a plastic molding tool, wherein a rotary movement of a drive device is converted by a converting device (26) into an axial movement of the needle element (24). In order to achieve optimum plastic production, that is to say to permit optimum movement of the needle element (24) both during the idle stroke movement and also during the process regulation phase and during deceleration, the converting device has at least one slide path (30) and a follower element (50) which is guided in the slide path (30), wherein the at least one slide path (30) which is angled, that is to say which has path pitches which are different from each other, is formed on a slide path surface which is concentric with respect to the center line (42) of the needle element.

23 Claims, 7 Drawing Sheets

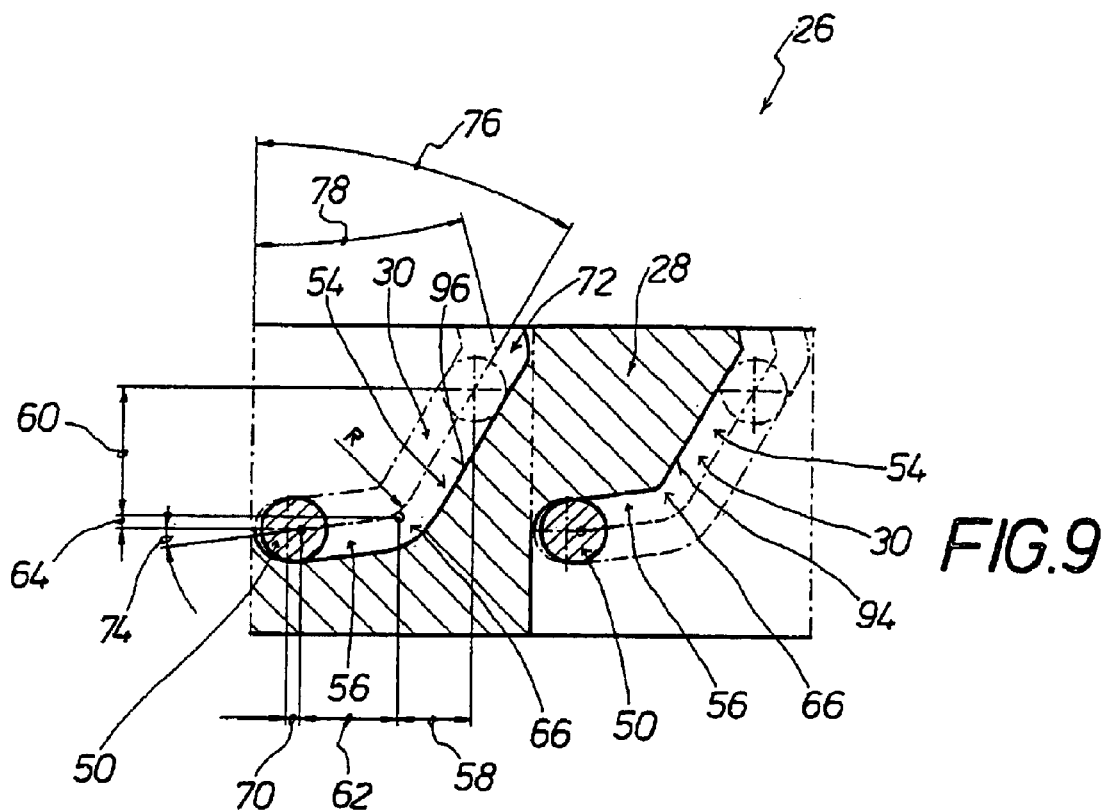
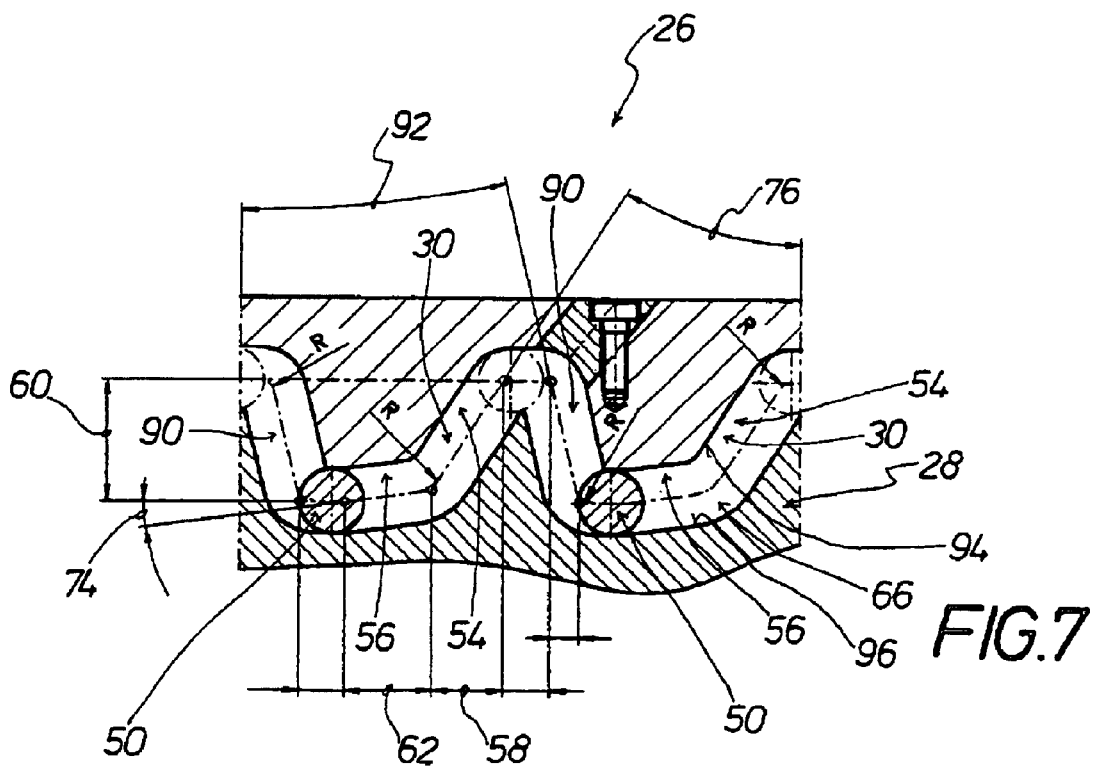

REGULATING AND CONTROL DEVICE FOR A NEEDLE ELEMENT OF A HOT OR COLD CHANNEL OF A PLASTIC SHAPING TOOL

BACKGROUND OF THE INVENTION

The invention concerns a control and regulating device for a needle element of a hot or cold channel of a plastic molding tool, wherein rotation of a drive device is converted by means of a converting device into an axial movement of the needle element Such control and regulating devices are known for example from U.S. Pat. No. 5,078,589 or U.S. Pat. No. 5,238,378. The converting devices provided in those known control and regulating devices, for converting rotation of a drive device into an axial movement of the needle element, have a screw and nut element of constant pitch. That constant pitch of the screw and nut element determines the movements of the needle element of the hot or cold channel of the corresponding plastic molding tool.

Demands for up-to-date processing of injection-moldable plastic materials with their individual process-specific and physical criteria to provide the respective plastic moldings are not satisfied or are only inadequately satisfied or are only satisfied by virtue of a suitable compromise, in regard to fastest possible production cycles, dealing carefully with the injection molding materials, that is to say injection-moldable plastic materials, dealing carefully with the molding tools, an optimum injection molding process control, making use of motor-driven drive devices and reducing the level of wear of the respective needle element or the drive device with such screw and nut elements of constant pitch.

Admittedly, small or normal pitches of the screw and nut element involve a high force and a very substantial self-locking action when pressure is applied or in terms of needle locking, as well as fine adjustability, but they suffer from the disadvantage that the respective no-load or idle stroke of the needle element is highly time-intensive and that possible process regulation can be effected only very sluggishly, that is to say involving a great deal of time. That time penalty puts a load on the operating cycle and increases costs in the above-mentioned idle stroke range for example for opening the needle element for the fastest possible quantitative through-flow of the plastic material, as for example hot channel needle elements can have a needle stroke of between 8 and 16 mm or more. Consequently, when the screw and nut element involve small pitches, reactive oscillation as rapidly as possible is not adequately afforded for process regulation purposes so that the efficiency of the regulating device which usually involves an electronic regulating device is not put to use or is not completely put to use. The respectively desired level of quality of production of the respective plastic pars can consequently not be kept stable or stabilised.

Admittedly, a fast movement of the needle element in the idle stroke range can be implemented with a greater or high pitch for the screw and nut clement of the converting device of known control and regulating devices for a needle clement of a hot or cold channel of a plastic molding tool, but during the process control phase the needle element becomes over-active, whereby necessary fine actuation becomes more difficult. In addition such an increased or high pitch results in an increased need for counter-holding force, which means that the expenditure in terms of energy and power is correspondingly increased. A further deficiency of such an increased or large pitch is that so-called spot-wise grinding-in of the needle element as a closure element of the runner region to the mold cavity causes considerable tool wear and is relatively force-less as the self-locking action of the needle element is at least greatly reduced as a consequence of the increased or great pitch of the screw and nut elements.

DE 196 11 880 A1 discloses an injection molding tool with a plurality of hot channel needle closure nozzles which are connected to an actuating device for the simultaneous actuation of a plurality of needle That known injection molding tool has a mechanical drive transmission between a stroke drive and needle carrier elements arranged at the individual needles. Elastic intermediate elements are provided between the needle carrier elements and the respective needle. Transversely with respect to the longitudinal extent of the needles, it is possible to provide a slider connected to the stroke drive, as the rigid mechanical drive transmission. The elastic intermediate elements used can be compression springs which are preferably in the form of diaphragm springs. The slider and/or the needle carrier elements can have inclined guides for converting the slider stroke movement into the working movement of the needles, which working movement is transverse with respect to the slider movement The object of the invention is to provide a control and regulating device of the kind set forth in the opening part of this specification, in which the opening and closing times of the needle element are reduced, but at the same time fine control is possible.

SUMMARY OF THE INVENTION

The foregoing object is achieved by providing a converting device which has at least one slide path and a feeler or follower element which is guided on the slide path, wherein the at least one slide path is provided on a slide path surface which is concentric with respect to the center line of the needle element.

In consideration of those factors, the object of the invention is to provide a control and regulating device of the kind set forth in the opening part of this specification, which so-to-speak combines together the advantages of a low and a high pitch and eliminates the disadvantages thereof.

In a control and regulating device of the kind set forth in the opening part of this specification, in accordance with the invention that object is attained in that the converting device has at least one slide path and a feeler or follower element which is guided on the slide path, wherein the at least one slide path is provided on a slide path surface which is concentric with respect to the center line of the needle element.

The at least one slide path can be of optimum design in a simple manner and can be individually configured as desired in order to permit the desired axial movement of the needle element, that is to say as desired a rapid idle stroke movement and a process regulation and deceleration movement of the needle element, which is slow in comparison therewith. The needle element may involve a needle element of a full cross-section, a hollow needle combined with such a needle element, for example of a compression needle unit, or the like. Such needle elements or control and regulating devices for a hot or cold channel of a plastic molding tool are described in the present applicant's prior patent application Ser. No. 198 57 735. The control and regulating device according to the invention is suitable by way of example for all needle elements or molding tools described in said prior patent application.

The at least one slide path of the converting device of the control and regulating device according to the invention can in this case extend over an angle of 360 degrees of angle or more, around the center line of the needle element. It may be advantageous if two or more slide paths are provided distributed uniformly around the center line of the needle element in order, with a rotation of the drive device through a small angle, to produce the desired axial displacement of the needle element. That small rotary angle is dependent on the number of slide paths, that is to say inversely proportional to the number of slide paths. With two slide paths the rotary angle can be 180 degrees or less than 180 degrees. With three slide paths the rotary angle can be 120 degrees or slightly less. Implementation of the smallest possible rotary angle is also dependent on the diameter of the slide path surface for the slide paths. The greater that diameter is, the correspondingly greater can be the number of slide paths, that is to say the correspondingly smaller can be said rotary angle. A small rotary movement of the drive device affords the advantage that, for example when using a worm drive with an extreme transmission ratio, the speed of rotation of the drive worm can be drastically reduced, thereby resulting in a corresponding time saving. The sane applies also for example for chain, toothed belt and gear drives as well as in relation to toothed rack versions and the like, in which respect the rotary speed or the piston stroke movement can be drastically reduced. In addition—for example in clean-room production of plastic articles—it is possible to use electrical stepping or servo motors which have a high torque and which if required rotate at low speed and which afford very rapid reaction options. During the corresponding slight rotary movement, the entire axial stroke movement of the needle element is performed, that is to say the idle stroke movement and the process regulation and deceleration movement.

In accordance with the invention the at least one slide path can be provided in a rotatably mounted sleeve element which has the slide path surface and which is operatively connected to the drive device. In this case the at least one slide path can be provided on the internal surface of the sleeve element, which forms the slide path surface.

The sleeve element with the at least one slide path can be axially immovably rotatably supported and provided with a drive output gear with which a drive gear is in meshing engagement. The drive output gear may involve for example a worm gear. The drive gear is then a worm spindle.

The needle element can be provided non-rotatably in the case of such a control and regulating device of the above-described kind, and can have at least one radially projecting feeler or follower element.

Another possibility provides that the sleeve element with the needle element forms a rigid unit and is axially displaceable and rotatable about the center line of the needle element and that the at least one follower element is provided non-rotatably and axially immovably. This last-described alternative configuration involves so-to-speak a reversal of the control and regulating device or converting device, as described hereinbefore.

Likewise it is possible for the at least one slide path to be provided in a portion of the needle element which is disposed non-rotatably and for the at least one follower element to project from the rotatable sleeve element. This also involves only a reversal of the principle according to the invention of the converting device of the control and regulating device according to the invention.

In accordance with the invention the at least one follower element can be formed by a cylinder, a roller or a pin. In order to withstand very high counter pressures or counter forces in a wear-resistant manner, the at least one pin can be provided with a curved or cambered flattened sliding surface. A sliding surface of such a configuration provides for a reduced pressure in relation to surface area, which results in a corresponding reduction in wear.

In the case of the control and regulating device according to the invention, it is preferable if the at least one slide path has a fast-displacement portion of large pitch and an adjoining process regulation and deceleration portion of comparatively small pitch. Independent patent protection is requested in that respect.

It is preferred in this case if the process regulation and deceleration portion, on the side remote from the fast-displacement portion, is adjoined by a self-locking portion. The self-locking portion is preferably of a zero pitch.

In order in the event of over-control of the drive device to ensure that the at least one follower element is not separated from or moved away from the associated slide path, it is desirable if the fast-displacement portion, on the side from the process regulation and deceleration portion, is adjoined by a catch hook portion.

Desirably, provided between each of the individual slide path portions of the at least one slide path is a respective rounded slide curve portion in order to achieve a suitable movement of the follower element on the slide path and consequently a corresponding movement of the associated needle element.

In accordance with the invention the at least one slide path can be provided with mutually parallel slide path surfaces. In the case of such a design configuration, at least two slot-shaped slide paths can be provided on the slide path surface which is concentric with respect to the center line of the needle element, being equidistantly spaced in the peripheral direction of the slide path surface. In this arrangement, the at least two slot-shaped slide paths are provided separately from each other in the peripheral direction of the slide path surface. It is however also possible for the at least two slot-shaped slide paths to be respectively connected together by means of a needle return portion. In the first-mentioned case with mutually separated slot-shaped slide paths, it is necessary for the drive device to be driven with a reciprocating motion in order to move the needle element forward and back, while in the case of the structure in which the slot-shaped slide paths are respectively connected together by means of a needle return portion, it is possible for the drive device to be rotated only in one direction and in that situation to successively implement the closing and opening movement of the needle element.

An advantage of the configuration according to the invention of the control and regulating device with at least two slot-shaped slide paths which are respectively connected together by means of a needle return portion, that is to say which extend closed in themselves around the slide path surface, is that the needle return portion can be of a pitch which can be greater than the pitch of the fast-displacement portion so that, with a constant drive or angular speed of the drive device, the needle return motion takes place still faster than the fast-displacement motion, that is to say the fast feed motion of the needle element which is followed by the process regulation and deceleration movement of the needle element.

Another possible configuration of the control and regulating device according to the invention provides that the at least one slide path has two slide surfaces which are disposed in diametrally and also axially opposite relationship on the slide path surface and which are arranged to extend in mutually parallel relationship, wherein an associated portion of the follower element bears in guided relationship against each of the two slide surfaces. This embodiment of the control and regulating device according to the invention also provides that it is possible to have more than one slide path with two respective diametrally and axially oppositely disposed slide surfaces which are arranged to extend in mutually parallel relationship, wherein a portion of the associated follower element bears in guided relationship against each of the slide surfaces which are disposed in paired diametrally and axially opposite relationship. Those diametrally and axially oppositely disposed slide surfaces of the at least one slide track are each axially accessible from one side or the other so that in each case therefore—in contrast to the above-described slot-shaped slide paths—this arrangement affords open slide paths. That can be desirable from points of view involving manufacture.

A farther simplified variant, that is to say which is even easier to manufacture, of the control and regulating device according to the invention, is characterised in that the at least one slide path has a single slide surface, against which the associated follower element or the associated follower element portion is urged by means of a spring device. In this case at least two slide paths can be provided separately from each other in the peripheral direction on the slide path surface which is concentric with respect to the center line of the needle element, the at least two slide paths each having a single slide surface. With this design configuration it is necessary for the drive device to be driven with a reciprocating movement in order to move the needle element forward and back.

It is however also possible for the slide surfaces of the at least two slide paths of the last-described alternative configuration to be respectively connected together by means of a needle return portion so as to provide a slide path which is closed in itself and which extends around the slide path surface. With this design configuration it is possible for the drive device to be driven only in one direction of rotation and for the needle element to be axially reciprocated. So that with such a design configuration of the last-mentioned kind, with a constant speed of rotation of the drive device, the needle return movement can also be effected at a higher speed than the fast displacement of the needle element, the needle return portion can be of a pitch which is greater than the pitch of the fast-displacement portion.

The last-described embodiment of the control and regulating device according to the invention with at least one slide path having a single slide surface against which the follower element is urged by means of a spring device therefore involves an open slide path which can be precisely manufactured in a simple manner, unlike a slot-shaped slide path.

BRIEF DESCRIPTION OF THE DRAWINGS

Further details will be apparent tom the description hereinafter of embodiments illustrated in the drawing of the control and regulating device according to the invention for a needle element of a hot or cold channel of a plastic molding tool. In the drawing:

FIG. 7 is a view similar to FIG. 4 showing a development along section line Aw—Aw in FIG. 1 to clearly show an embodiment of the control and regulating device, wherein the slot-shaped slide paths of the converting device for converting a rotary movement of the drive device into an axial movement of the needle element are respectively connected together by means of a needle return portion so that the slide paths are closed in themselves in the peripheral direction of the slide path surface which is concentric with respect to the center line of the needle element, FIG. 9 shows a section taken along section line Aw1—Aw1 as shown in FIG. 8 as a development similarly to the developments shown in FIGS. 3 and 7.

DETAILED DESCRIPTION

Figure 1:
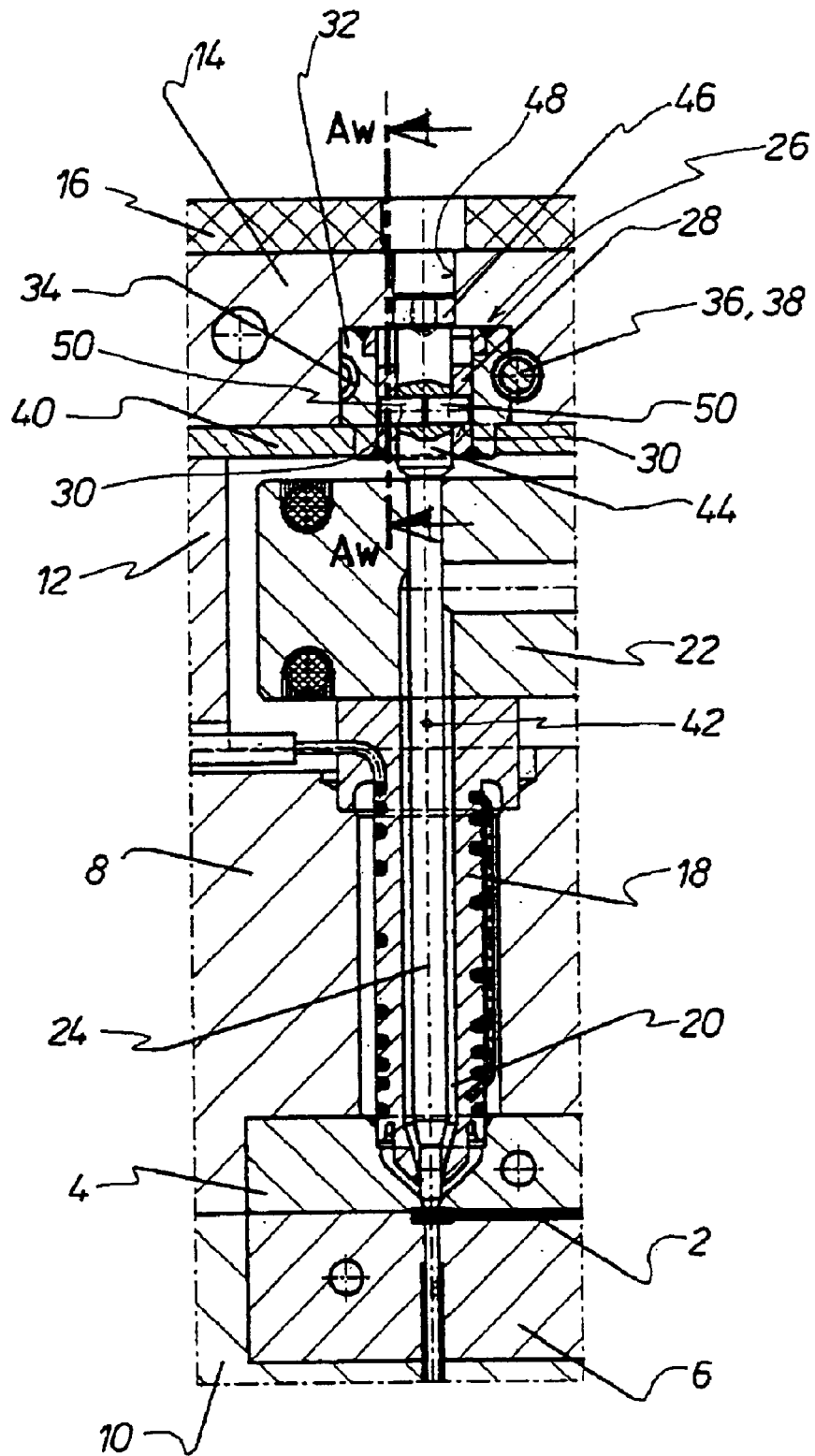
FIG. 1 is a sectional view showing part of a first embodiment of the control and regulating device, with the needle element assuming the closed position.

FIG. 1 shows an injection molding 2 between two mold units 4 and 6 which are clamped and fixed between two mold plates 8 and 9. Urged against the mold plate 8 is a spacer plate 12 which bears against a clamping plate 14. The clamping plate 14 is covered by an insulating plate 16 which serves for heat insulation purposes.

Associated with the mold insert 4 is a hot channel nozzle 18 having a hot channel 20. The hot channel nozzle 18 is provided on a hot channel distributor block 22.

Arranged in the hot channel 20 is a needle element 24 which is operatively connected to a converting device 26 for converting a rotary movement of a drive device (not shown) into an axial movement of the needle element 24. The converting device 26 has a sleeve element 28 which is formed with two diametrally oppositely disposed slot-shaped sliding guide paths 30 which are described in greater detail hereinafter in particular with reference to FIG. 3 and with reference to FIG. 6. The sleeve element 28 of the converting device 26 is fixedly connected to a drive output gear 32 which is in the form of a worm gear ring 34. Meshing with the worm gear ring 34 of the drive output gear 32 is a worm spindle 38 forming a drive gear 36. The worm spindle 38 is non-rotatably connected to the above-mentioned drive device (not shown). The drive device is for example an electric motor or an electric stepping or servo motor. The drive device can also be formed by a hydraulic or pneumatic motor or the like.

The sleeve element 28 which is formed with the slot-shaped slide paths 30 forms a unit with the drive output gear 32 and is rotatably and axially immovably supported in the clamping plate 14. Serving for that purpose is a holding and centering element 40 which is disposed between the clamping plate 14 and the spacer plate 12. The holding and centering element 40 also assists with the rotatable support for the drive output gear 32 and thus the sleeve element 28 which is disposed in concentric relationship with the center line 42 of the needle element.

Figure 4:
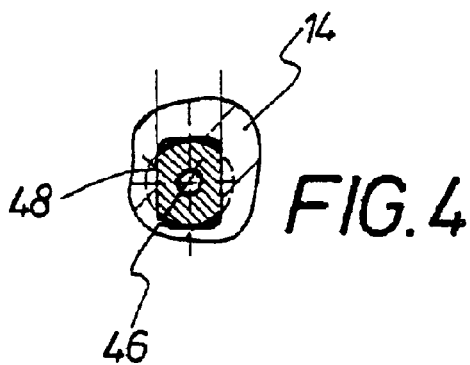
FIG. 4 shows a view in section taken along section line IV—IV in FIG. 2 to clearly show the non-rotatable arrangement of the axially displaceable needle element.

To make the needle element 24 non-rotatable and axially displaceable, the needle element 24 has at the upper end of a portion 44 of enlarged cross-section a rotation-preventing element 46. As can be seen from FIG. 4, the rotation-preventing element 46 is of a cross-section which differs from a circular shape. The clamping plate 14 has a through hole 48 whose internal cross-section is matched to the cross-section of the rotation-preventing element 46 so that the needle element 24 is prevented from rotating about the center line 42 of the needle element.

Two feeler or follower elements 50 which are in the form of cylinders or rollers project diametrally in opposite directions from the portion 44 of enlarged cross-section of the needle element 24. The follower elements 50 project into the slot-shaped slide paths 30 of the sleeve element 28 of the converting device 26.

The mode of operation of the follower elements 50 and the slot-shaped slide paths 30 of the sleeve element 28 of the converting device 26, that is to say the operating movements of the needle element 24, will be described hereinafter in particular with reference to FIG. 3.

Figure 2:
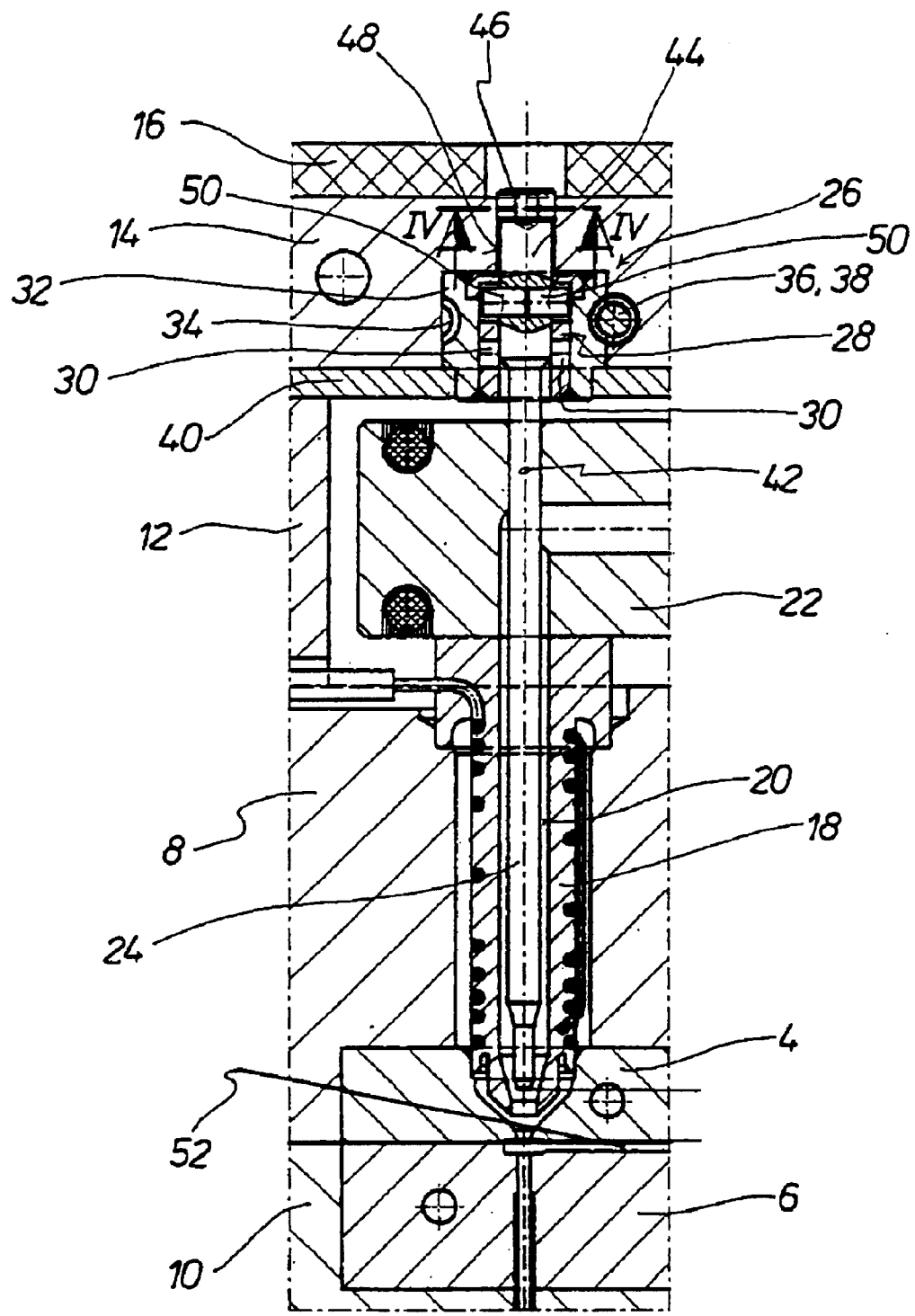
FIG. 2 shows the control and regulating device of FIG. 1, with the needle element in the open position, FIG. 3 diagrammatically shows a development along section line Aw—Aw in FIG. 1 to clearly show the sleeve element, which has two diametrally appositely disposed slot-shaped slide paths, of the converting device of the control and regulating device for the needle element as shown in FIGS. 1 and 2.

In FIG. 1 the sleeve element 28 is in such a rotational position that the needle element 24 is in its closed position. In comparison, FIG. 2 shows the rotational angular position of the sleeve element 28 of the converting device 26, in which the needle element 24 of the hot channel nozzle 18 assumes its open position in order to form a fluid communication between the hot channel 20 and the mold cavity 52 which is provided between the two mold inserts 4 and 6, for the injection molding (see FIG. 1).

The same details are identified in FIG. 2 by the same references as in FIG. 1 so that there is no need for all those features to be described in detail once again with reference to FIG. 2. It will be appreciated that other configurations and/or combinations of hot channel nozzles 18 with plastic molding tools are also possible and conceivable, from the structure illustrated in FIGS. 1 and 2 of the drawing. In this respect attention is directed by way of example to the present applicant's prior application Ser. No. 198 57 735 which has already been mentioned hereinbefore.

Figure 3:
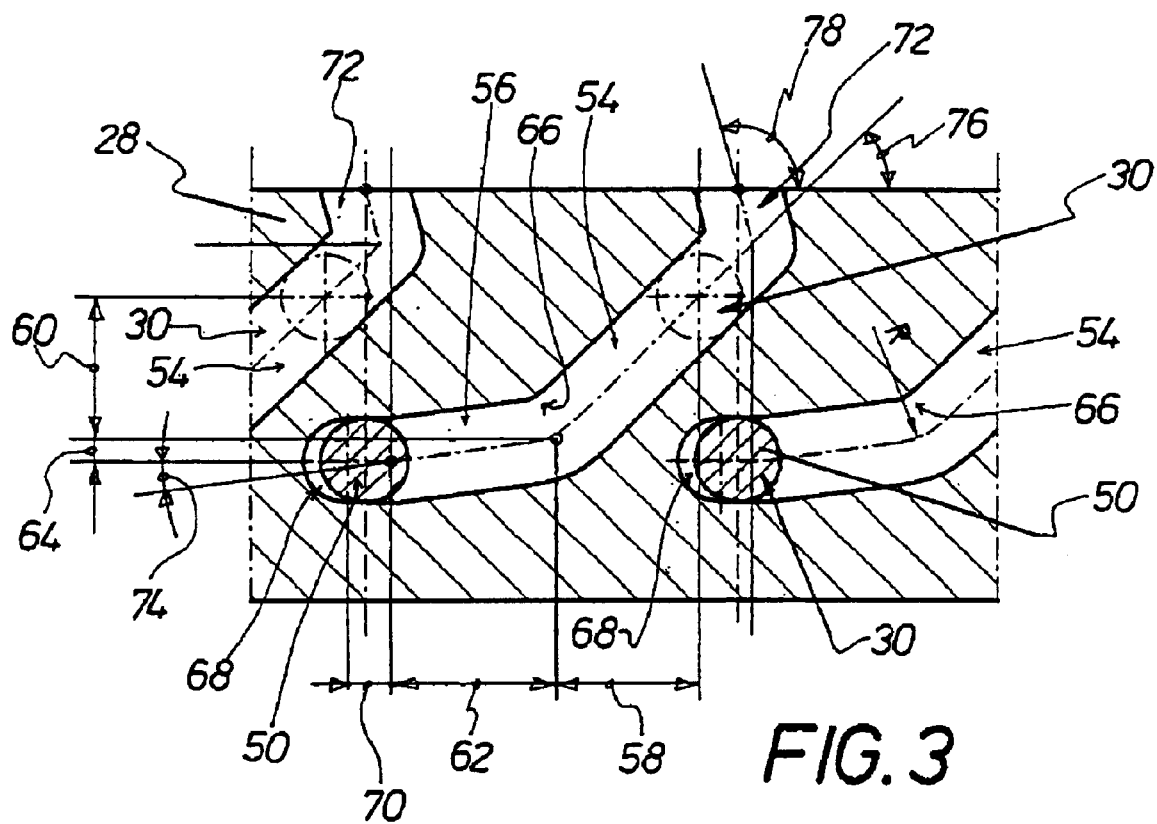

FIG. 3 is a diagrammatic view showing the sleeve element 28 (see FIGS. 1 and 2) in a development. The sleeve element 28 has two diametrally mutually opposite slot-shaped slide paths 30. Each of the two slide paths 30 has a fast-displacement portion 54 of large pitch and an adjoining process regulation and deceleration portion 56 of compara- tively small pitch The fast-displacement portion 54 of the respective slot-shaped slide path 30 is determined in the peripheral direction of the sleeve element 28 by an acceleration rotational portion 58 to which the acceleration needle stroke 60 corresponds, in the axial direction. Advantageously, a fast idle stroke movement of the needle element 24 takes place along that acceleration needle stroke 60 when the sleeve element 28 is rotated about the center line 42 of the needle element. In that case the sleeve element 28 therefore only performs a rotary movement about a rotary angle corresponding to the acceleration rotational portion 58 which is less than 180 degrees of angle.

The process regulation and deceleration portion 56 of the respective slot-shaped slide path 30 is determined in the peripheral direction of the sleeve element 28 by a process regulation rotational portion 62. Associated with the process regulation rotational portion 62 is an axial process regulation and deceleration needle stroke 64 which is small in comparison with the acceleration needle stroke 60.

The transition between the fast-displacement portion 54 and the process regulation and deceleration portion 56 of the respective slot-shaped slide path 30 is in the form of a rounded slide curve portion 66, the radius of curvature of which is identified by R in FIG. 3.

The process regulation and deceleration portion 56 of the respective slot-shaped slide path 30 is adjoined, on the side remote from the fast-displacement portion 54, by a self-locking portion 68 which is of zero pitch. The self-locking portion 68 of the respective slot-shaped slide path 30 has a short locking rotational portion 70 in the peripheral direction.

The fast-displacement portion 54 of each slot-shaped slide path 30 is adjoined on the side remote from the process regulation and deceleration portion 56 by a catch hook portion 72 which prevents the follower element 50 moving out of the associated slot-shaped slide path 30 in the event of over-actuation of the drive device. Separation of the needle element 24 from the sleeve element 28 of the converting device 26 is therefore prevented by means of the catch hook portions 72.

The pitch angle of the process regulation and deceleration portion 56 is indicated in FIG. 3 by the arcuate angle 74, the pitch angle of the fast-displacement portion 54 is indicated by the arcuate double-headed arrow 76 and the pitch angle of the catch hook portion 72 is indicated by the arcuate double-headed arrow 78. The pitch angles 74 and 76 are smaller than 90 degrees of angle. The pitch angle 78 of the catch hook portion 72 is greater than 90 degrees of angle in order to form a catch hook.

While the fast-displacement portion 54 with a large pitch angle 76, upon rotation of the sleeve element 28, therefore permits a fast idle stroke displacement of the needle element 24, the pitch angle 74 of the process regulation and deceleration portion 56 of the respective slot-shaped slide path 30 is so dimensioned that when the drive is stationary a self-locking effect occurs or during process regulation the device affords balanced sensitivity and reactivity on the part of the needle element 24.

Figure 5:
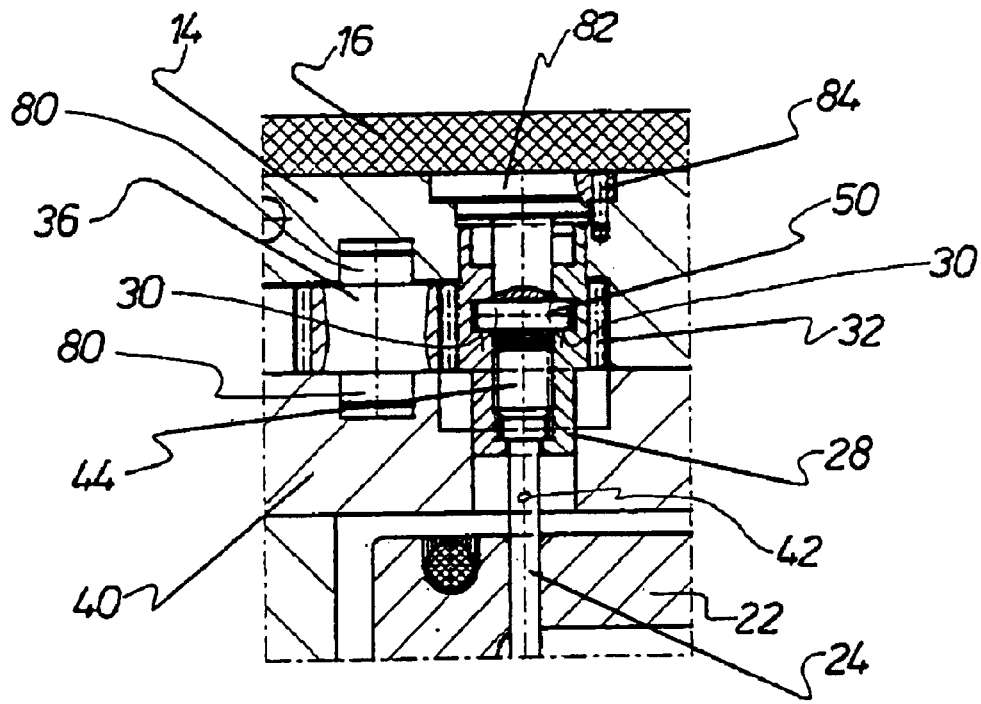
FIG. 5 shows another embodiment of the converting device of the control and regulating device for a needle element of a hot or cold channel of a plastic molding tool with a rotatable and axially displaceable sleeve element.

FIG. 5 is a sectional view similar to FIGS. 1 and 2 showing a portion of a needle element 24, which extends trough a hot channel distributor block 22. A drive gear 36 with its two trunnions 80 facing in opposite directions is supported rotatably between a holding and centering element 40 above the hot channel distributor block 22 and a clamping plate 14 which is covered by an insulating plate 16. The drive gear 36 which is operatively connected to a drive device (not shown) is for example in the form of a cylindrical pinion meshing with a cylindrical drive output gear 32 which is also in the form of a pinion. The drive output gear 32 is an integral component of a sleeve element 28 which is fixedly connected to the needle element 24. For that purpose the sleeve element 28 is provided for example with a female screwthread and the needle element 24 on a portion 44 of enlarged cross-section is provided with a male screwthread which matches same. In this embodiment as shown in FIG. 5 the sleeve element 28 is therefore in the form of a unit with the needle element 24. The sleeve element 28 is rotatably supported in the clamping plate 14 and is displaceable axially, that is to say in the direction of the center line 42 of the needle element. The sleeve element 28 is formed on the inside with two diametrally oppositely disposed slot-shaped slide paths 30, as are shown in FIG. 3 as a development and as have been described in detail hereinbefore. A follower element 50 which is in the form of a pin projects into the diametrally oppositely disposed slot-shaped slide paths 30. The follower element 50 is mounted to a holding element 82 which is axially immovably fixed between the clamping plate 14 and the insulating plate 16 and which is secured to prevent rotational movements about the center line 42 of the needle element by means of pins 84 on the stationary clamping plate 14. In this embodiment therefore the follower element 50 is non-rotatable and axially immovable.

When the sleeve element 28 with its drive output gear 32 is driven in rotation by means of the drive gear 36, the relative rolling movement between the stationary and non-rotatable follower element 50 and the slot-shaped slide paths 30 in the sleeve element 28 affords a rotational movement of the needle element 24 about its center line 42 and simultaneously a corresponding axial displacement of the needle element 24, which takes place quickly during the idle stroke and slowly and precisely during the process regulation and deceleration stroke.

Figure 6:
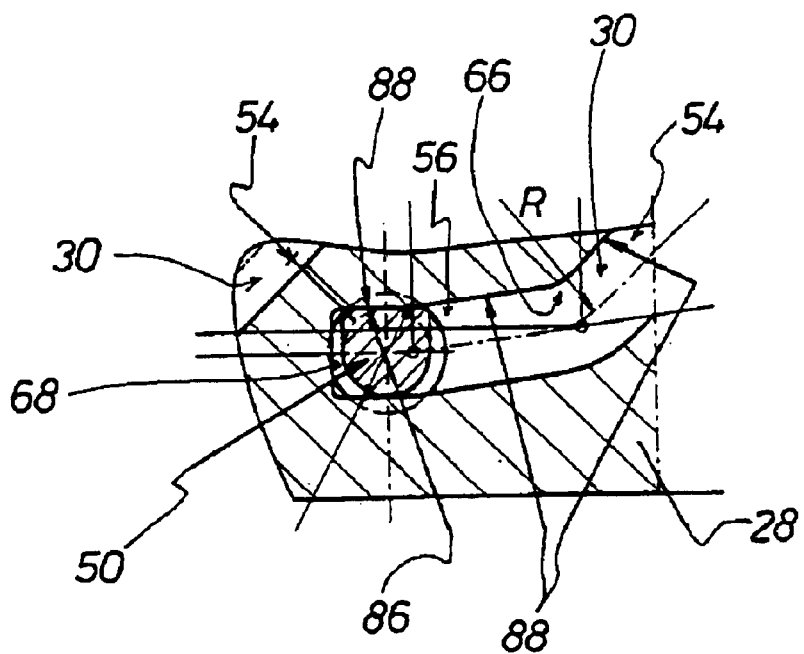
FIG. 6 is a view similar to FIG. 3 showing a portion of the slot-shaped slide paths with a follower element which is in the form of a pin with a flattened slide surface.

FIG. 6 shows a portion of a development of the sleeve element 28 with two slot-shaped slide paths 30 and the fast-displacement portion 54 thereof and the adjoining process regulation and deceleration portion 56 as well as the rounded slide curve portion 66 between the two portions 54 and 56, of the radius of curvature R, and the self-locking portion 68 with the zero pitch.

In order to keep the pressure in relation to surface area as between the follower element 50 and the slot-shaped slide paths 30 at a minimum, this embodiment provides that the follower element 50 which is in the form of a pin has a flattened sliding surface 86. The sliding surface 86 can be curved or of a flat configuration. The sliding surface 86 slides along the control curve surfaces 88 which are loaded with the highest counter pressure forces, in which respect the pressure in relation to surface area as between the follower element 50 and the slot-shaped slide paths 30, along the process regulation and deceleration portion 56 and the self-locking portion 68, is reduced by the enlarged sliding surface 86. That results in a higher load-bearing capability or resistance to wear. So that adaptation of the sliding surface 86 to the control curve surfaces 88 is at the optimum, the follower element 50 can be mounted cylindrically, that is to say with a round cross-section, in the holding element 82, thereby affording rotational adaptation to the control curve surfaces 88 of the slide paths 30.

To enhance the performance of the individual components, they can be hardened or coated for hardening thereof.

FIG. 7 shows a development similar to that shown in FIG. 3 illustrating the sleeve element 28 with two diametrally oppositely disposed slot-shaped slide paths 30, each of which has a fast-displacement portion 54 of large pitch and an adjoining process regulation and deceleration portion 56 of comparatively small pitch.

The same features are denoted in FIG. 7 by the same references as in FIG. 3 so that there is no need for all those features to be described once again in detail with reference to FIG. 7.

While in FIG. 3 the two diametrally oppositely disposed slot-shaped slide paths 30 are separated from each other in the peripheral direction, FIG. 7 shows a structure in which the slot-shaped slide paths 30 are respectively connected to each other by means of a needle return portion 90 so that this involves a slide path which is closed in itself, around the slide path surface which is concentric with the center line of the needle element. The respective needle return portion 90 is of a pitch which is indicated by the arcuate arrow 92 and whose pitch angle is larger than the pitch angle of the respective fast-displacement portion 54, as is indicated by the arcuate arrow 76. This provides that, upon a stepwise rotary movement of the drive device, that is to say the sleeve element 28, in a single direction of rotation, the return movement of the needle element 24 (see FIG. 1 or FIG. 2) takes place more rapidly than the fast displacement of the needle element in a direction towards the mold cavity 52.

It will be appreciated that the pitch angle 92 of the respective needle return portion 90 must not be greater than the pitch angle 76 of the respective fast-displacement portion 54.

Figure 8:
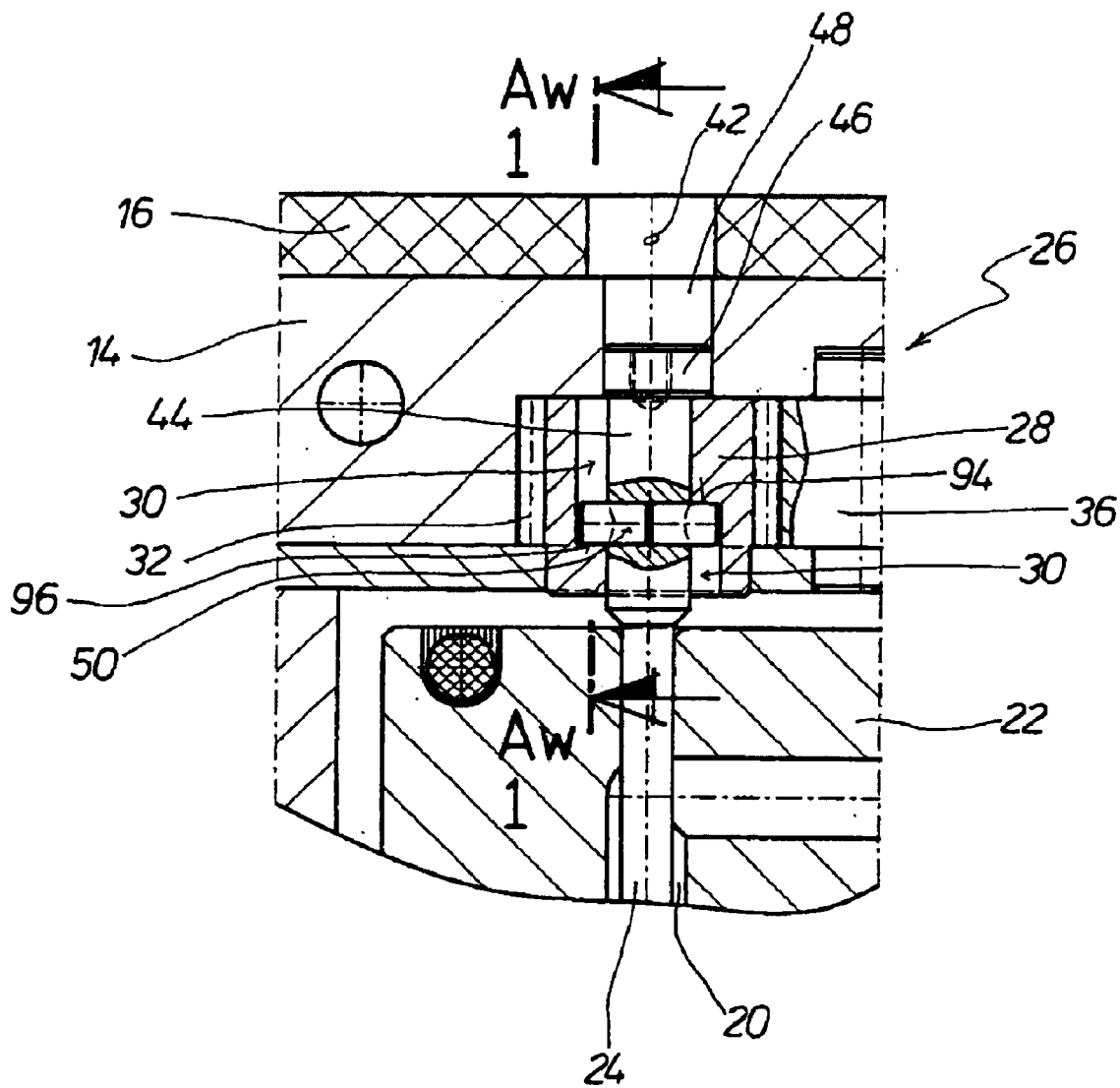
FIG. 8 is a sectional view similar to FIG. 5 of still another embodiment of the converting device of the control and regulating device for a needle element of a hot or cold channel of a plastic molding tool with a rotatably supported and axially immovable sleeve element and an axially displaceable needle element which is prevented from rotating.

FIGS. 8 and 9 show an embodiment of the converting device 26 for a needle element 24, wherein the sleeve element 28 of the converting device 26 has a slide path 30 with two slide surfaces 94 and 96 which are disposed in diametrally and axially opposite relationship on the slide path surface concentric with respect to the center line 42 of the needle element, and which are arranged in mutually parallel relationship, wherein bearing against each of the two axially oppositely disposed slide surfaces 94 and 96 is an associated portion of the follower element 50. This therefore does not involve a slot-shaped slide path but a slide path which is open at one respective side. The same features are also identified in FIG. 9 by the same references as in FIGS. 3 and 7 so that there is no need for all those features to be described once again with reference to FIG. 9. A corresponding consideration also applies to FIG. 8 in which identical features to those in FIGS. 1, 2 and 5 are denoted by the same references so that there is no need for all those features to be described in detail once again with reference to FIG. 8. It is clearly apparent from FIG. 8 however that the portion of the follower element 50, which projects radially on one side, bears snugly against the slide surface 96 and that at the same time the portion of the follower element 50, which projects diametrally on the other side, bears snugly against the axially opposite slide surface 94 so that rotation of the sleeve element 28 in one direction of rotation or the other about the center line 42 of the needle element affords an upward and downward axial movement of the needle element 24 which is prevented from rotating.

Figure 10:
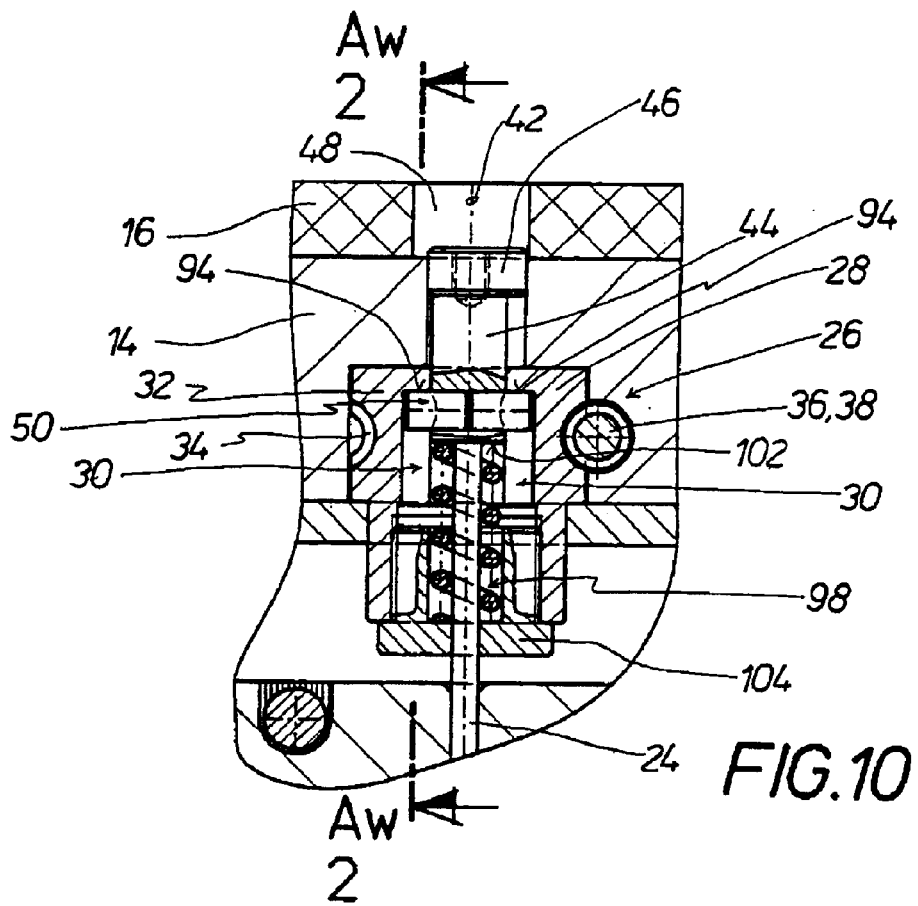
FIG. 10 shows a sectional view similar to FIGS. 5 and 8 of a further embodiment of the converting device of the control and regulating device for a needle element of a hot or cold channel of a plastic molding tool wherein the needle element has two diametrally oppositely disposed slide paths which each have a single open slide surface, and the follower element is urged against said slide surfaces by means of a spring device.
Figure 11:
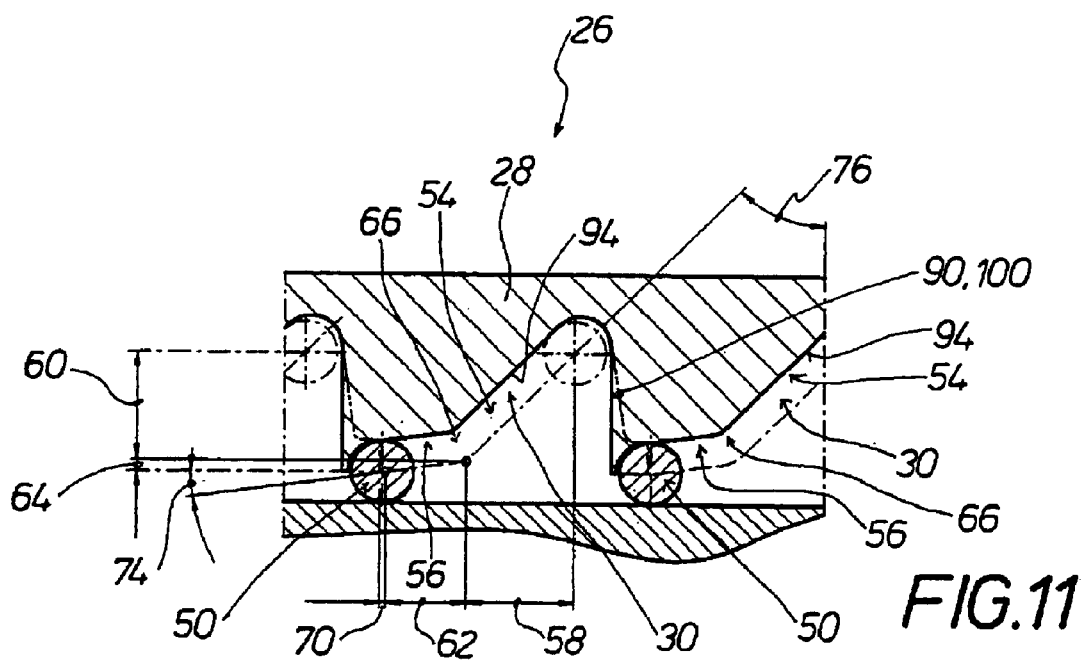
FIG. 11 shows a development similarly to the developments of FIGS. 3, 7 and 9 along section line Aw2—Aw2 in FIG. 10 to clearly illustrate the two diametrally oppositely disposed slide paths with the respective one open slide surface.

FIGS. 10 and 11 illustrate a configuration of the converting device 26 of the control and regulating device according to the invention, with two diametrally oppositely disposed slide paths 30 with each have a single slide surface 94. The diametrally oppositely disposed projections of the follower element 50 are urged in this case by means of a spring device 98 against the slide surfaces 94, which are open at one side, of the diametrally oppositely disposed open slide pats 30.

FIG. 11 in which identical features are identified as in FIGS. 3, 6, 7 and 9 illustrates diametrally oppositely disposed slide paths 30 which are separated from each other. That is to say, it is necessary in this case for the sleeve element 28 of the converting device 26 to be rotated with a reciprocating movement in order to move the needle element axially forward and back. It will be appreciated that it would also be possible for the diametrally oppositely disposed slide paths 30 which are open at one side to be connected together in the peripheral direction, similarly to the structure shown in FIG. 7. That is diagrammatically indicated in FIG. 11 by the double dash-dotted lines 100. With such a design for the sleeve element 28 with a needle return portion 90 indicated by the double dash-dotted line 100, it would then be possible for the sleeve element 28 to be driven stepwise only in one direction of rotation in order to move the needle element 14 precisely forward and back axially in an oscillation motion.

FIG. 10 shows the spring element 98 which is clamped in the sleeve element 28 between the end 102 of the portion 44 of enlarged cross-section of the needle element 24 and a plug 104 which is screwed into the sleeve element 28 and which is fixedly connected thereto.

What is claimed is:

1. A control and regulating device for a needle element (24) of a hot or cold channel (20) of a plastic molding tool, wherein a rotary movement of a drive device is transformed by means of a converting device (26) into an axial movement of the needle element (24), characterised in that the converting device (26) has at least one slide path (30) and a follower element (50) guided on the slide path (30), wherein the at least one slide path (30) is provided on a slide path surface which is concentric with respect to the center line (42) of the needle element.

2. A control and regulating device as set forth in claim 1 characterised in that the at least one slide path (30) is provided in a rotatably supported sleeve element (28) which has the slide path surface and which is connected to the drive device.

3. A control and regulating device as set forth in claim 2 characterised in that the at least one slide path (30) is provided on the internal surface of the sleeve element (28), said internal surface forming the slide path surface.

4. A control and regulating device as set forth in claim 2 characterised in that the sleeve element (28) is axially immovably rotatably supported and provided with a drive output gear (32) with which a drive gear (36) is in meshing engagement.

5. A control and regulating device as set forth in claim 1 characterised in that the needle element (24) is provided non-rotatably and the follower element (50) projects radially away therefrom.

6. A control and regulating device as set forth in claim 2 characterised in that the sleeve element (28) forms a unit with the needle element (24) and is axially displaceable and rotatable about the center line (42) of the needle element and that the at least one follower element (50) is non-rotatable and axially immovable.

7. A control and regulating device as set forth in claim 1 characterised in that the at least one follower element (50) is formed by a cylinder, a roller or a pin.

8. A control and regulating device as set forth in claim 7 characterised in that the at least one follower element pin is provided with a flattened sliding surface (86).

9. A control and regulating device in particular as set forth in claim 1 characterised in that the at least one slide path (30) has a fast-displacement portion (54) of large pitch and an adjoining process regulation and deceleration portion (56) of comparatively small pitch.

10. A control and regulating device as set forth in claim 9 characterised in that adjoining the process regulation and deceleration portion (56) on the side remote from the fast-displacement portion (54) is a self-locking portion (68).

11. A control and regulating device as set forth in claim 10 characterised in that the self-locking portion (68) has a pitch of zero.

12. A control and regulating device as set forth in claim 9 characterised in that adjoining the fast-displacement portion (54) on the side remote from the process regulation and deceleration portion (56) is a catch hook portion (52).

13. A control and regulating device as set forth in claim 9 characterised in that provided between each of the individual sliding path portions (54, 56, 68) is a respective rounded sliding curve portion (66).

14. A control and regulating device as set forth in claim 1 characterised in that the at least one slide path (30) is provided with mutually parallel slide surfaces (94, 96).

15. A control and regulating device as set forth in claim 14 characterised in that provided at the slide path surface which is concentric with respect to the center line (42) of the needle element are at least two slot-shaped slide paths (30) equidistantly spaced in the peripheral direction.

16. A control and regulating device as set forth in claim 15 characterised in that the at least two slot-shaped slide paths (30) are provided separately from each other.

17. A control and regulating device as set forth in claim 15 characterised in that the at least two slot-shaped slide paths (30) are respectively connected together by means of a needle return portion (90).

18. A control and regulating device as set forth in claim 17 characterised in that the needle return portion (90) is of a pitch (92) which is greater than the pitch (76) of the fast-displacement portion (54).

19. A control and regulating device as set forth in claim 1 characterised in that the at least one slide path (30) has two slide surfaces (94, 96) which are disposed in diametrally and axially opposite relationship on the slide path surface and which are arranged in mutually parallel relationship, wherein bearing in guided relationship against each of the two slide surfaces (94, 96) is an associated portion of the follower element (50).

20. A control and regulating device as set forth in claim 1 characterised in that the at least one slide path (30) has a single slide surface (94) against which the follower element (50) is urged by means of a spring device (98).

21. A control and regulating device as set forth in claim 20 characterised in that at least two slide paths (30) are provided separately from each other on the slide path surface which is concentric with respect to the center line (42) of the needle element, the at least two slide paths (30) each having a single slide surface (94).

22. A control and regulating device as set forth in claim 20 characterised in that the slide surfaces (94) of the at least two slide paths (30) are respectively connected together by means of a needle return portion (90).

23. A control and regulating device as set forth in claim 22 characterised in that the needle return portion (90) is of a pitch (92) which is greater than the pitch (76) of the fast-displacement portion (54).

* * * * *